(12) United States Patent
Grywacheski et al.

(10) Patent No.: US 10,538,134 B2
(45) Date of Patent: Jan. 21, 2020

(54) WALKING BEAM AXLE ASSEMBLY FOR AN AGRICULTURAL IMPLEMENT

(71) Applicant: DUTCH BLACKSMITH SHOP LTD., Pilot Butte (CA)

(72) Inventors: Sheldon Joseph Grywacheski, Humboldt, CA (US); Ronald Galen Jordan, Pilot Butte (CA)

(73) Assignee: Dutch Blacksmith Shop Ltd., Pilot Butte (CA)

( * ) Notice: Subject to any disclaimer, the term of this patent is extended or adjusted under 35 U.S.C. 154(b) by 163 days.

(21) Appl. No.: 15/787,787

(22) Filed: Oct. 19, 2017

(65) Prior Publication Data

US 2019/0030971 A1 Jan. 31, 2019

(30) Foreign Application Priority Data

Jul. 26, 2017 (CA) ..................................... 2974530

(51) Int. Cl.
*B60G 5/02* (2006.01)
*A01B 76/00* (2006.01)
*A01C 3/06* (2006.01)

(52) U.S. Cl.
CPC ................ *B60G 5/02* (2013.01); *A01B 76/00* (2013.01); *A01C 3/06* (2013.01); *B60G 2200/318* (2013.01)

(58) Field of Classification Search
CPC .............. B60G 5/02; A01B 76/00; A01C 3/06
See application file for complete search history.

(56) References Cited

U.S. PATENT DOCUMENTS

| | | | | |
|---|---|---|---|---|
| 2,316,374 A | * | 4/1943 | Townsend ................ | B60G 5/02 280/677 |
| 2,595,474 A | * | 5/1952 | Marvin .................... | B60G 5/02 280/124.17 |
| 3,132,876 A | * | 5/1964 | Patterson ................ | B60G 5/02 280/677 |
| 6,488,114 B1 | * | 12/2002 | McMahon ............... | B60G 5/02 180/411 |

* cited by examiner

*Primary Examiner* — Faye M Fleming
(74) *Attorney, Agent, or Firm* — Ryan W. Dupuis; Ade + Company Inc.; Kyle R. Satterthwaite

(57) ABSTRACT

A walking beam assembly mounts onto the main frame of an agricultural trailer in place of a single axle assembly. The walking beam assembly has a main axle beam serving as the only connection to the main frame. Two walking beams, with a pair of wheels on each, are supported at opposing ends of the main axle beam. Two hubs are pivotally supported on the main axle beam at respective hub locations spaced inward axially of the main axle beam relative to the ends of the main axle beam. A pair of brace members are coupled between each hub and the respective walking beam at diametrically opposing sides of the walking beam pivot. The hubs and the brace members are pivotal relative to the main axle beam about the same walking beam axis as the walking beams.

20 Claims, 10 Drawing Sheets

WALKING BEAM AXLE ASSEMBLY FOR AN AGRICULTURAL IMPLEMENT

This application claims foreign priority benefits from Canadian Patent Application 2,974,530 filed Jul. 26, 2017.

FIELD OF THE INVENTION

The present invention relates to a walking beam axle assembly for an agricultural implement, for example an agricultural trailer such as a manure spreader, and more particularly the present invention relates to a walking beam axle assembly having a main axle beam pivotally supporting a pair of braced walking beams at opposing ends thereof such that the main axle beam can be readily attached to a frame of the implement interchangeably in the same mounting location as a conventional single axle.

BACKGROUND

Typically, agricultural trailer designs need to be easily configured to meet customer requests. One of these configuration is axle configuration between single and multiple axles. The base design or main structure need to accept different axle configurations. When considering single and tandem/walking axle design the challenge become the design of the multiple axle structure. A most common method of a trailer to accept multiple axles is to use the trailer main frame structure as part of the support structure for the multiple axles. This means multiple main frame configurations for various axle configuration.

A characteristic of multiple axles when turning is significant tire side loading, this load is transmitted into the axle and main structures. These designs have multiple pivot points to resist the side loading force. These pivots are commonly greased and are under the main trailer frame.

SUMMARY OF THE INVENTION

According to one aspect of the invention there is provided a walking beam axle assembly for an agricultural implement having a main frame adapted for movement across ground in a forward working direction, the assembly comprising:

a main axle beam adapted to be mounted in fixed relation to the main frame of the implement to extend in a lateral direction oriented transversely to the forward working direction of the implement;

two walking beams supported at opposing ends of the main axle beam respectively;

each walking beam being pivotally coupled to the main axle beam at an intermediate pivot location on the walking beam between opposing ends of the walking beam;

each walking beam being pivotal relative to the main axle beam about a respective walking beam axis oriented in the lateral direction of the main axle beam;

two hubs pivotally supported on the main axle beam at respective hub locations spaced inward axially of the main axle beam relative to the opposing ends of the main axle beam respectively;

each hub being coupled in fixed relation to a respective one of the walking beams by a pair of brace members coupled between the hub and the walking beam at respective brace locations on the walking beam;

the brace locations of each walking beam being spaced apart at diametrically opposing sides of the intermediate pivot location of the respective walking beam; and a pair of wheels rotatable supported on each walking beam at spaced apart wheel locations at diametrically opposing sides of the intermediate pivot location of the respective walking beam;

each hub being pivotal relative to the main axle beam about the walking beam axis of the respective walking beam.

According to a second aspect of the present invention there is provided an agricultural implement comprising:

a main frame adapted for movement across ground in a forward working direction; and a walking axle assembly comprising:

a main axle beam adapted to be mounted in fixed relation to the main frame of the implement to extend in a lateral direction oriented transversely to the forward working direction of the implement;

two walking beams supported at opposing ends of the main axle beam respectively;

each walking beam being pivotally coupled to the main axle beam at an intermediate pivot location on the walking beam between opposing ends of the walking beam;

each walking beam being pivotal relative to the main axle beam about a respective walking beam axis oriented in the lateral direction of the main axle beam;

two hubs pivotally supported on the main axle beam at respective hub locations spaced inward axially of the main axle beam relative to the opposing ends of the main axle beam respectively;

each hub being coupled in fixed relation to a respective one of the walking beams by a pair of brace members coupled between the hub and the walking beam at respective brace locations on the walking beam;

the brace locations of each walking beam being spaced apart at diametrically opposing sides of the intermediate pivot location of the respective walking beam; and a pair of wheels rotatable supported on each walking beam at spaced apart wheel locations at diametrically opposing sides of the intermediate pivot location of the respective walking beam;

each hub being pivotal relative to the main axle beam about the walking beam axis of the respective walking beam.

Using the walking axle cross tube as the main structure and inner pivot the walking axle does not require the trailer main frame as supporting structure allowing a single main frame design to accept various axle designs.

The center of the main cross tube is also the pivot for the walking beam. The result is less design space for the walking axle components which allows the overall unit design to have a lower loading height. Also using a multi piece inner pivot assembly with a composite wear surface on the inner pivot which does not require lubrication maintenance can be further advantageous over prior art configurations.

The walking beam assembly may further include a pair of mounting plates at laterally opposing ends of the main axle beam having fastener apertures therein so as to be adapted to be fastened to the main frame of the implement using threaded fasteners extending through the mounting plates as the only connection of the assembly to the main frame of the implement.

The brace locations on each walking beam are preferably located between the pair of wheels of the respective walking beam in a longitudinal direction of the walking beam.

Preferably each of the brace members are coupled to the respective walking beam at a location which is between the respective wheels of the walking beam.

When a cross sectional shape of the main axle beam defines a perimeter boundary, preferably the walking beam axes of both walking beams are contained within the perimeter boundary of the main axle beam.

Preferably, a bushing formed of a material having a low coefficient of friction encircling the main axle beam between each hub and the main axle beam.

In one embodiment, each hub fully encircles the main axle beam. In this instance, the main axle beam may be a tubular member locating the walking beam axes concentrically within the tubular member. More particularly, when the main axle beam is a tubular member having a cylindrical outer surface, preferably the cylindrical outer surface rotatably supporting the hubs thereon, in which each hub comprises a plurality of arcuate sections coupled to one another using fasteners so as to fully encircle the cylindrical outer surface of the main axle beam.

According to a further embodiment, the main axle beam may include a top flange spanning a top side of the beam, a bottom flange spanning a bottom side of the beam, and at least one web connected between the top flange and the bottom flange. In this instance, the web is preferably interrupted at each of the hub locations such that each hub location may further include a pivot shaft fixed onto the main axle beam upon which the respective hub is pivotally supported.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
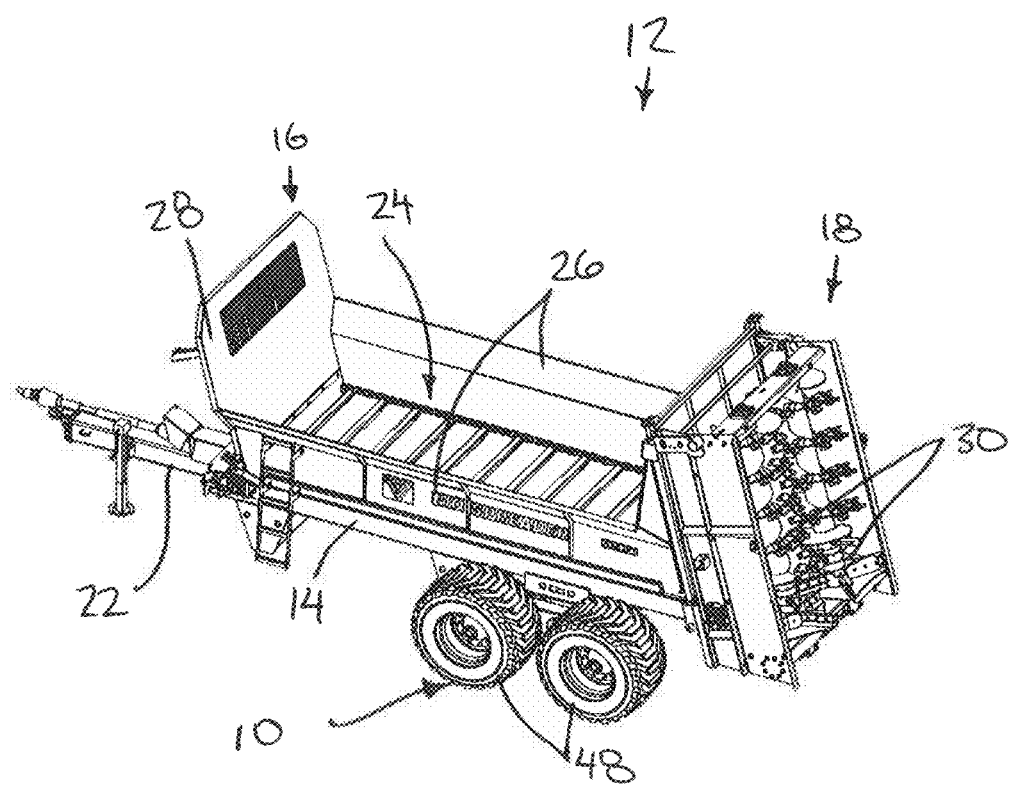
FIG. 1 is a perspective view of an agricultural manure spreading implement having a first embodiment of the walking beam axle assembly supported thereon.
Figure 2:
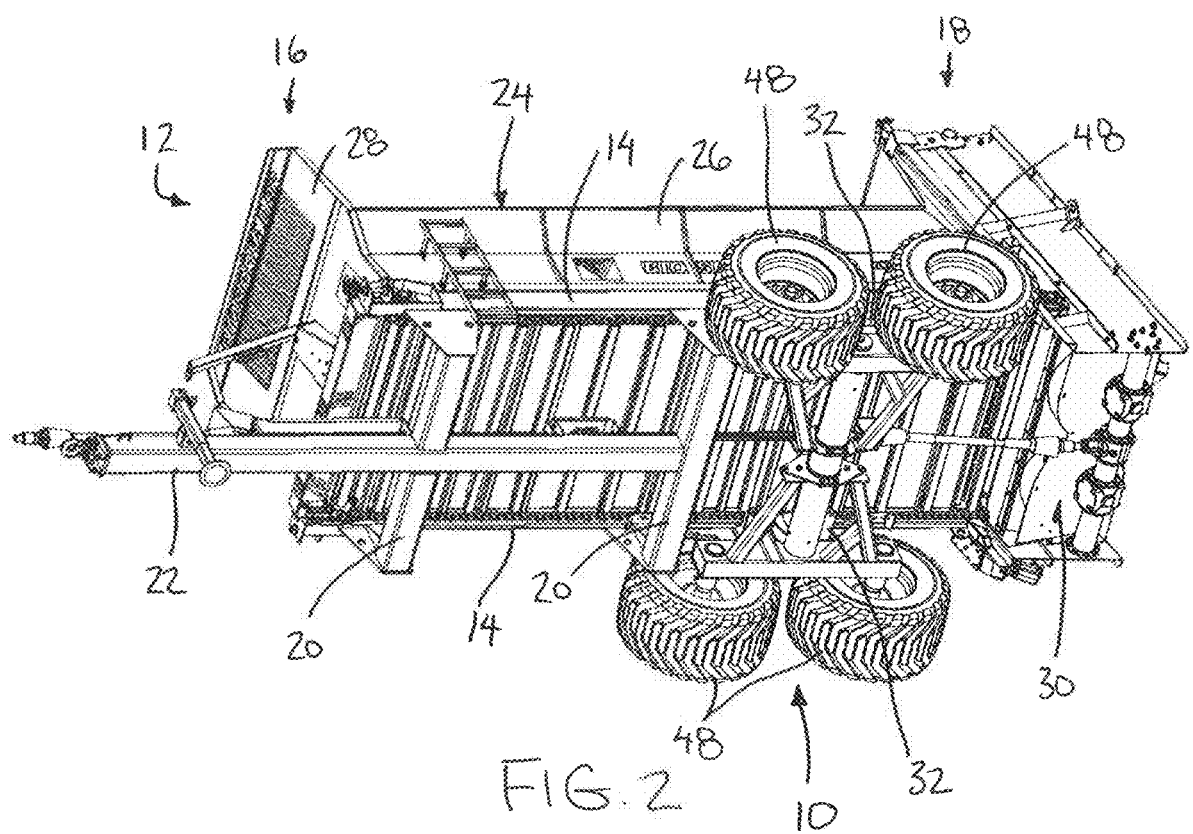
FIG. 2 is a perspective view of a bottom side of the implement according to the first embodiment of FIG. 1.
Figure 3:
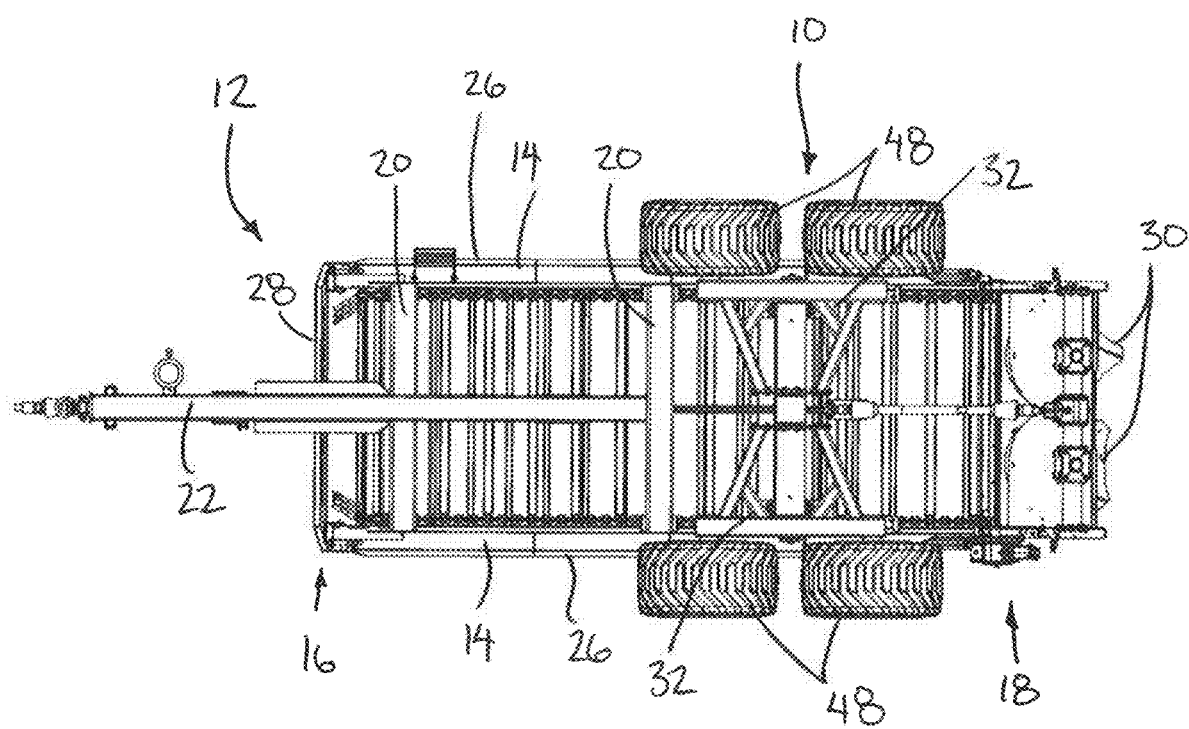
FIG. 3 is a bottom plan view of the implement according to the first embodiment of FIG. 1.
Figure 4:
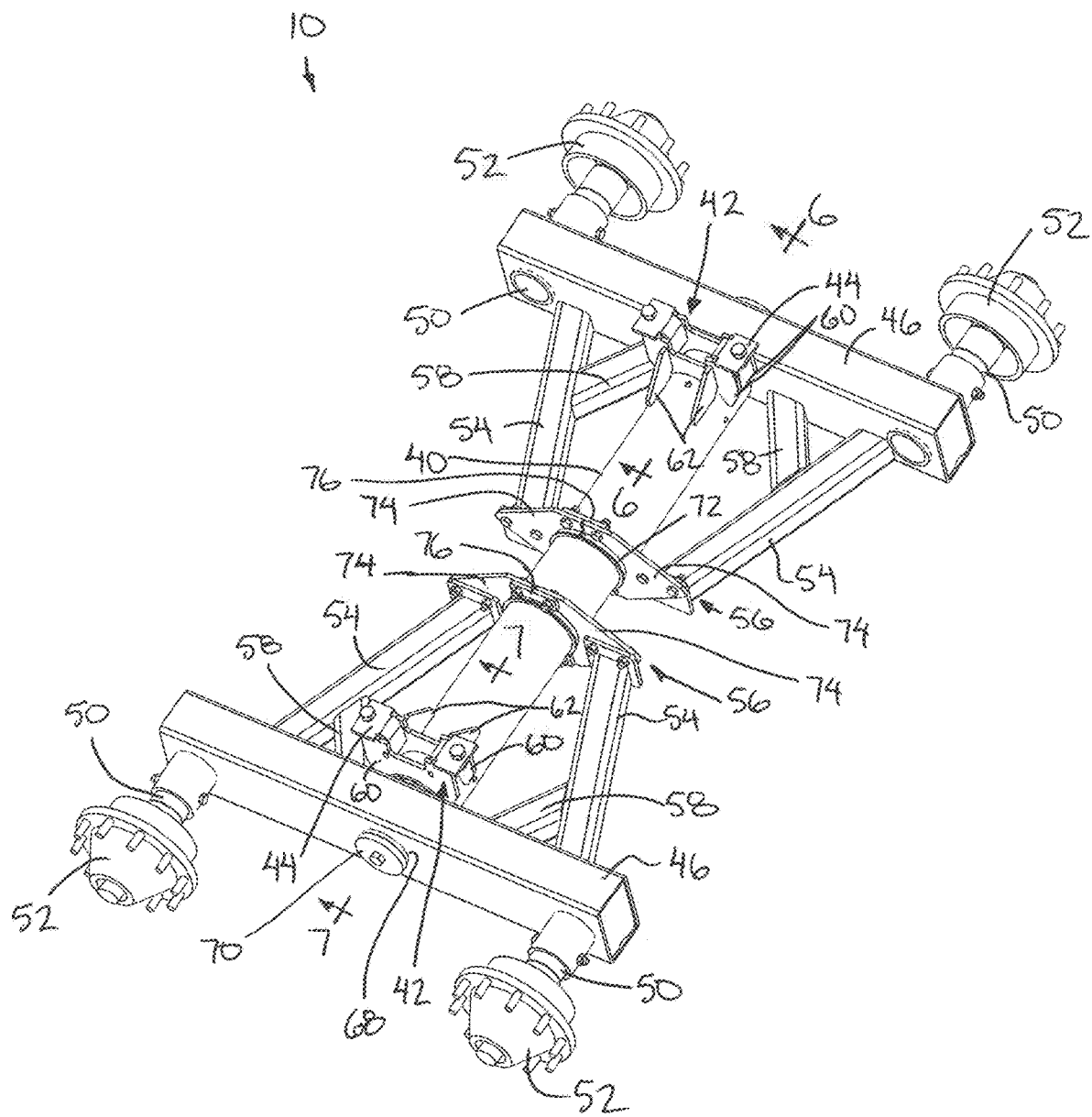
FIG. 4 is a perspective view of the walking beam axle assembly according to the first embodiment of FIG. 1.
Figure 5:
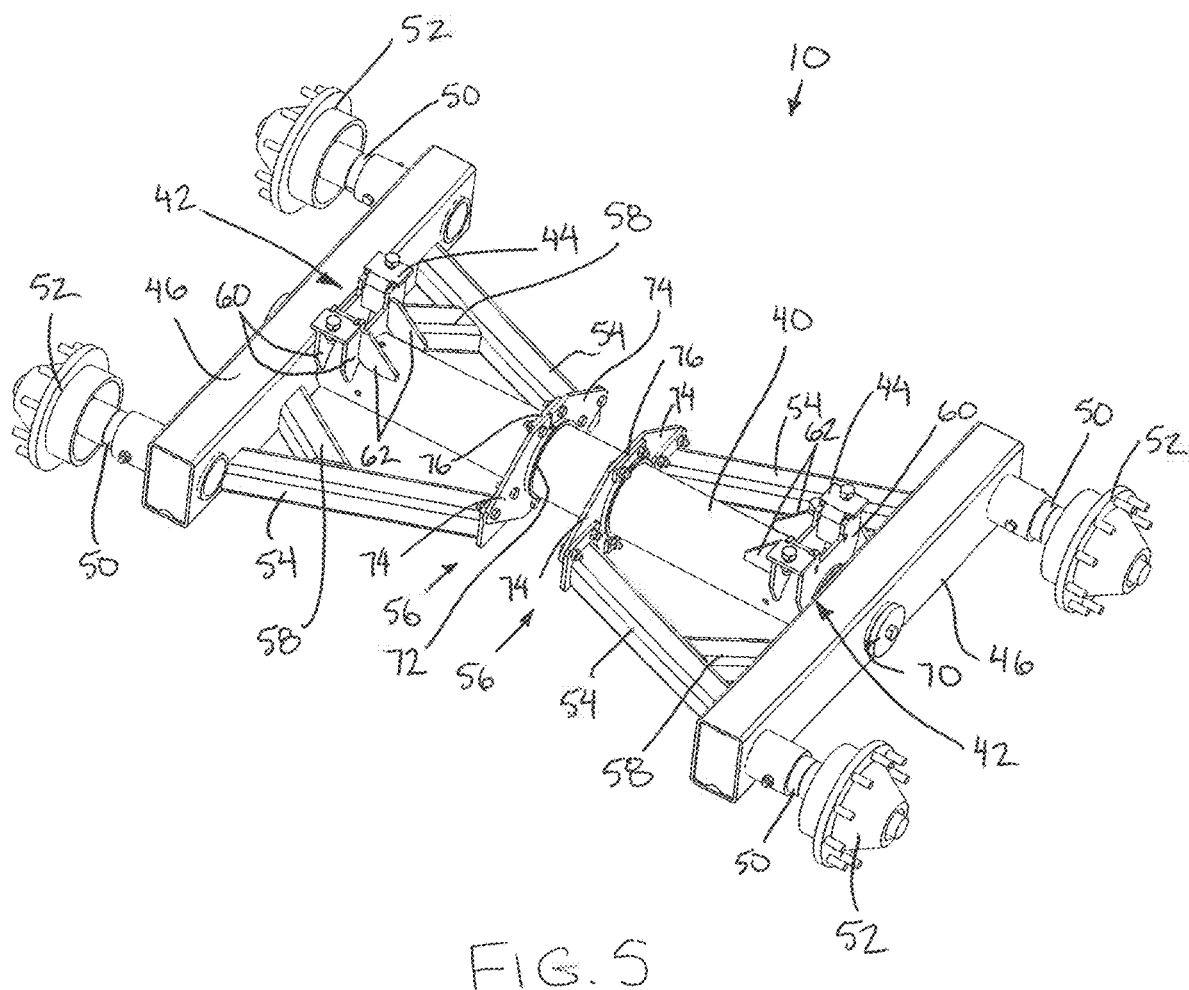
FIG. 5 is another perspective view of the walking beam axle assembly according to the first embodiment of FIG. 1.
Figure 6:
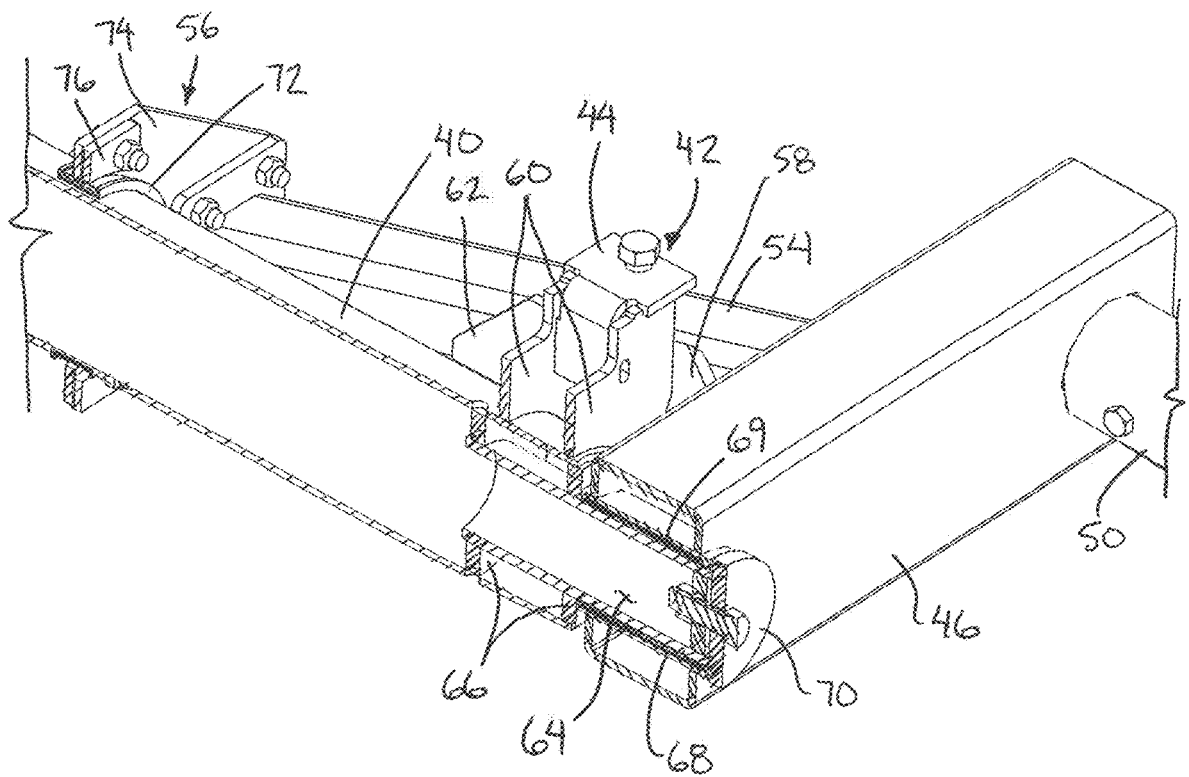
FIG. 6 is a sectional view along the line 6-6 in FIG. 4.
Figure 7:
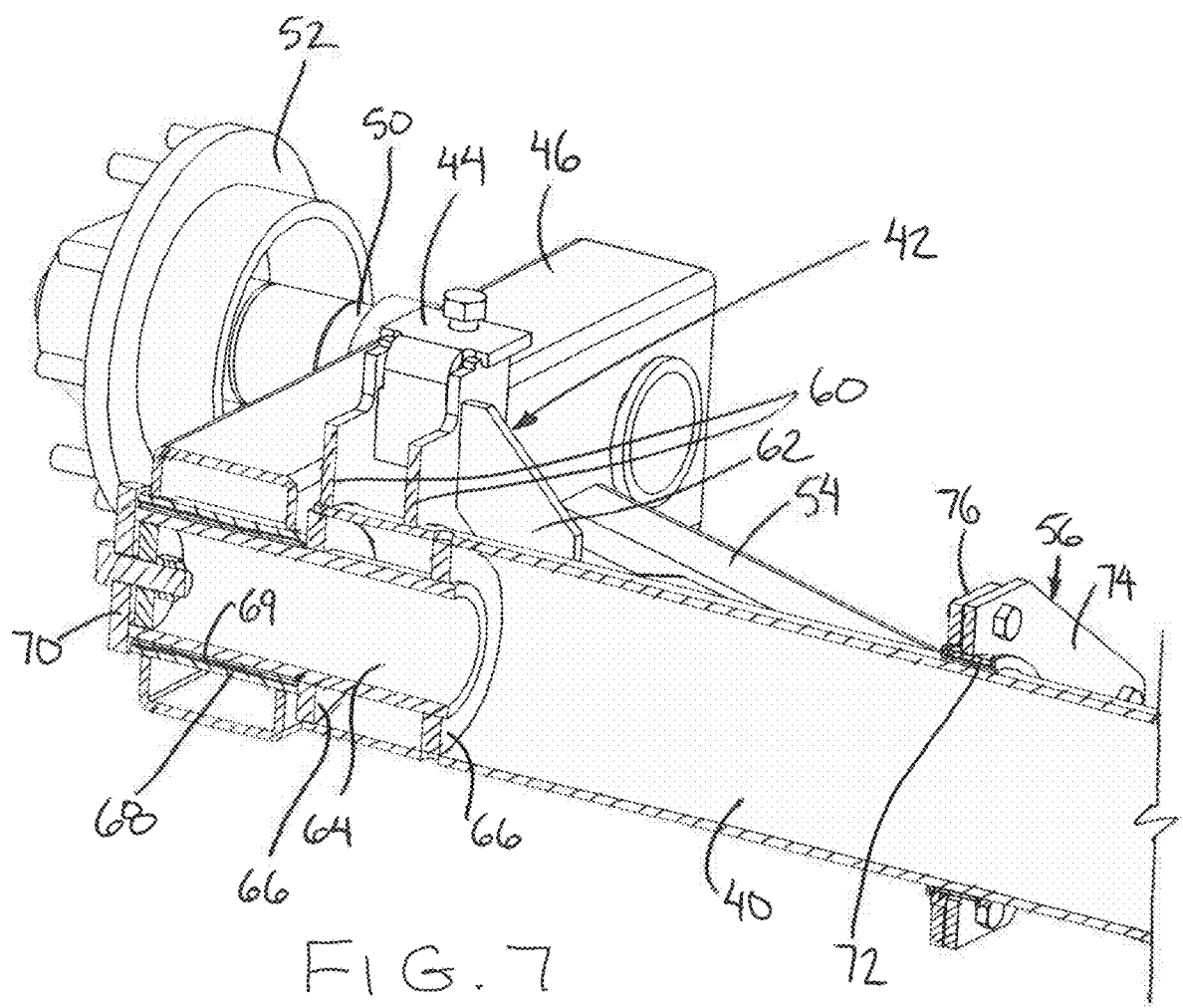
FIG. 7 is a sectional view along the line 7-7 in FIG. 4.

Referring to the accompanying figures there is illustrated a walking beam axle assembly 10 for use with an agricultural implement, for example an agricultural trailer such as a manure spreader 12 shown in FIGS. 1 to 3. More particularly the present invention relates to a walking beam axle assembly providing a walking beam suspension to a set of wheels which can be mounted onto the agricultural implement interchangeably with a single axle configuration using the same mounting locations on the agricultural implement.

In the illustrated embodiment of the agricultural implement, the manure spreader 12 comprises a main frame having two rails 14 extending longitudinally between a front end 16 and a rear end 18 of the frame along laterally opposing sides of the main frame. A plurality of crossbars 20 are connected laterally between the two rails 14 to form a rigid structure. The hitch beam 22 is coupled to the crossbars 20 to extend longitudinally forward beyond the front end of the rails for supporting a hitch coupling at the forward end thereof for attachment to a towing vehicle in a conventional manner. A compartment 24, defined by two longitudinally extending side walls 26 at opposing sides and a front wall 28 connected laterally therebetween, fully spans a top side of the main frame, for receiving and transporting manure therein. A plurality of rotating beaters 30 are mounted at the rear end of the frame for spreading manure from the compartment rearwardly and laterally outwardly from the rear end of the manure spreader as the manure spreader is towed in a forward working direction across the ground.

The main frame of the manure spreader 12 includes two axle mounting surfaces 32 supported in fixed relation to respective ones of the rails 14 at laterally opposing sides of the main frame, at an intermediate location in the longitudinal direction which is spaced longitudinally from both the front and rear ends of the frame. Each axle mounting surface comprises a rigid horizontal plate having fastener apertures therein for accepting the corresponding mounting surfaces of a single axle assembly or the walking beam axle assembly 10 according to the present invention interchangeably thereon.

Although two different embodiments of the walking beam axle assembly 10 are shown in the accompanying figures, the features in common with both embodiments will first be described herein.

In each instance, the walking beam axle assembly includes a main axle beam 40 which is elongate in a lateral direction of the implement to extend substantially the full width of the implement between the two axle mounting surfaces 32 at laterally opposing sides of the implement. A mounting bracket 42 is fixedly supported adjacent to each of the two opposing ends of the main axle beam. The mounting brackets 42 include respective upper plates 44 which are horizontally oriented and spaced apart from one another for alignment with the corresponding axle mounting surfaces 32 on the main frame of the implement. The upper plates 44 also include fastener apertures therein for alignment with corresponding fastener apertures in the two axle mounting surfaces of the implement.

The main axle beam 40 defines a common walking axis which is wholly contained within a boundary of the profile of the beam so as to be concentric with the beam and oriented in the lateral direction of the implement. A pair of the walking beams 46 are pivotally supported at opposing ends of the main axle beam such that the two beams are pivotal relative to the main axle beam and the main frame of the implement about the common walking axis independently of one another.

Each walking beam 46 is oriented perpendicularly to the walking axis so as to be oriented generally in the longitudinal direction of the implement when supported on level ground. Each beam is pivotally coupled at an intermediate pivot location which is generally centred in the longitudinal direction of the walking beam so as to be spaced longitudinally inward from both ends of the walking beam.

Two wheels 48 are rotatably supported on each walking beam towards longitudinally opposed ends thereof so as to be offset radially outwardly in diametrically opposing directions that are equal distances from the pivot location of the walking axis. Each walking beam supports a pair of pivot shaft 50 oriented parallel to the walking axis to define respective wheel axes about which the wheels 48 are rotatably supported respectively. Each pivot shaft 50 extends laterally outwardly from the respective walking beam beyond the respective side of the implement to support respective wheel hubs 52 of the wheels 48 thereon.

Each walking beam is further supported by two main brace members 54 which are mounted in fixed relation to the walking beam for pivotal movement together with the walking beam about the walking axis. Each brace member is fixed at an outer end to an inner side of the respective walking beam to extend laterally inwardly relative to the implement towards the opposing side of the implement. The two main brace members 54 on each walking beam are fixed to the walking beam at a location in proximity towards the opposing ends of the beam such that the brace locations where the two base members are fixedly coupled are located at diametrically opposing sides of the walking axis that are equal radial distances from the walking axis. The brace locations are nearer to the walking axis than the two wheel mounting locations such that both brace locations are between the wheel mounting locations. The two main brace members 54 of each walking beam extend laterally inwardly from the respective walking beam within a common plane with the walking beam at a slope tapering inwardly towards one another radially of the walking axis towards respective inner ends which are supported in pivotal relationship with the main axle beam as described in further detail below.

More particularly, each walking beam is associated with a respective axle hub 56 which is supported on the main axle beam at a hub location spaced laterally inwardly from the respective walking beam so as to be closer to a lateral centre of the main axle beam than the opposing ends of the axle beam. The hub is supported to be concentric with and rotatable about the walking axis that is located concentrically within the boundary of the profile of the main axle beam.

The inner ends of the two main brace members are fixedly attached to the axle hub 56 of the respective walking beam for pivotal movement together about the walking axis.

Each walking beam is further associated with the two secondary brace members 58 extending laterally inwardly from respective secondary brace locations on the walking beam towards respective inner ends fixed to the main brace members 54 at an intermediate location thereon. More particularly, each secondary brace location on the walking beam is located at an intermediate location which is longitudinally centred along the walking beam between the walking axle and the brace location of a respective one of the main brace members. The secondary brace members lie in a common plane with the main brace members and the walking beam. The secondary brace members extend laterally inwardly from the walking beam at a diverging slope relative to one another so as to be oriented transversely to the main brace members and such that the inner ends of the secondary brace members intersect the main brace members at an intermediate location thereon. Welded connections between the brace members and the walking beam ensure a rigid frame structure which pivots together with the respective axle hub 56 about the walking axis.

Turning now more particularly to the embodiment of FIGS. 1 through 7, the main axle beam in this instance comprises a cylindrical hollow tube member which locates the walking axis coaxially therein. The mounting bracket 42 at opposing ends of the main axle beam comprises two parallel support plates 60 which are perpendicular to the walking axis which are welded in fixed relation to the outer cylindrical surface of the main axle beam to extend radially upward. The upper plates 44 span horizontally between the top ends of the support plates 60 to locate the fastener apertures therein which serve to fasten the main axle beam to the main frame of the implement. Additional gussets 62 may be provided to support the support plates 60 rigidly relative to the main axle beam.

At both ends of the main axle beam, a main pivot shaft 64 is provided in the form of a cylindrical tube of reduced diameter relative to the main axle beam which is supported concentrically within the main axle beam to protrude axially outward beyond the respective end of the main axle beam. A pair of annular plates 66 span the radial gap between the inner portion of the pivot shaft 64 and the surrounding end of the main axle beam at axially spaced positions such that an inner one of the annular plates 66 is located at the inner end of the main pivot shaft while an outer one of the annular plates is located at the outer end of the main axle beam. Welded connections are provided to secure the main pivot shaft 64 to the annular plates 66 and to secure the annular plates 66 relative to the main axle beam.

The walking beam comprises a tubular member of rectangular cross-section having a sleeve 68 mounted within a transverse aperture extending fully through the walking beam at the walking axis such that the sleeve 68 can be axially slid onto the main pivot shaft 64 at the respective end of the main axle beam. A bushing sleeve 69 is received between the inner diameter of the sleeve 68 and the outer diameter of the main pivot shaft 64 to define a pivot connection between the walking beam and the main axle beam. The bushing sleeve thus occupies the radial space between the shaft 64 and the sleeve 68. The bushing sleeve typically comprises a metal, plastic, or composite material having a low coefficient of friction and which is self-lubricating so that no lubrication is required to be applied to maintain the pivot connection over time.

A circular plate forms an end cap 70 which can be fastened onto the outer end of each pivot shaft for retaining the respective walking beam in the axial direction between the outermost annular plate 66 at the end of the main axle beam and the cap 70. The cap may be retained on the end of the pivot shaft by a threaded fastener which is received along the walking axis by fasting through the cap into a threaded bore in the end wall of the pivot shaft.

The axle hub 56 in this instance comprises a singular body associated with each walking beam which is assembled to fully encircle and surround the main axle beam. More particularly the hub includes a sleeve of bushing material 72 having a low coefficient of friction, for example a self lubricating metal, plastic or composite material, in which the sleeve is snugly fit about the cylindrical outer surface of the main axle beam. The hub further comprises two main plates 74, supported perpendicularly to the walking axis in a generally common plane with one another, and each including an arcuate inner edge extending partway about the circumference of the main axle beam through a range of approximately 180°. A pair of joiner plates 76 are bolted to both main plates 74 at the diametrically opposed junctions of the two main plates such that in the assembled configuration the two main plates extend about the full circumference of the main axle beam at the location of the bushing sleeve 72 to rotatably support the hub on the cylindrical outer surface of the main axle beam. The inner ends of the main brace members 56 are fastened in fixed connection to the two main plates 74 of the respective hub at diametrically opposed locations on the hub.

Figure 8:
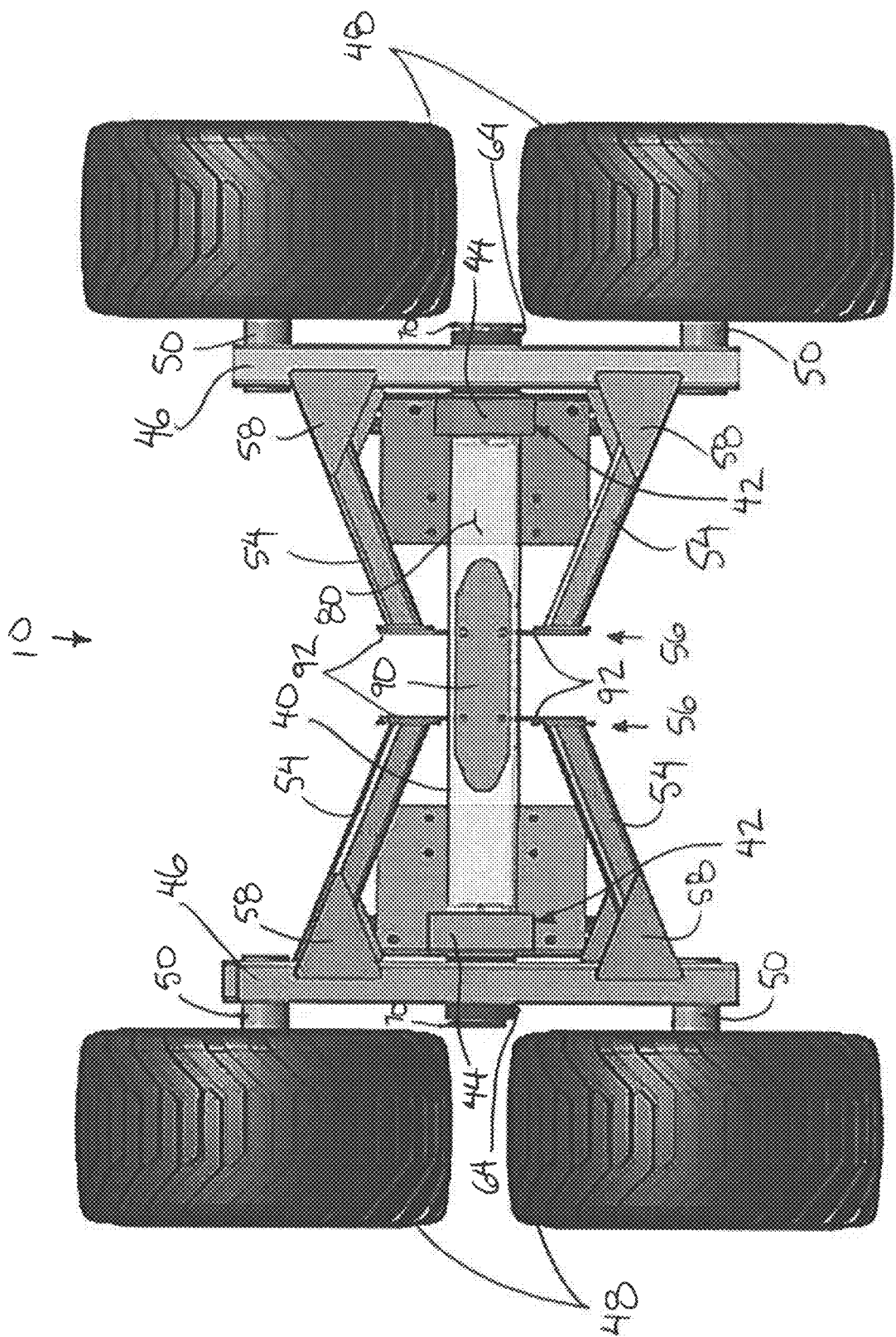
FIG. 8 is a bottom plan view of the walking beam axle assembly according to a second embodiment.
Figure 9:
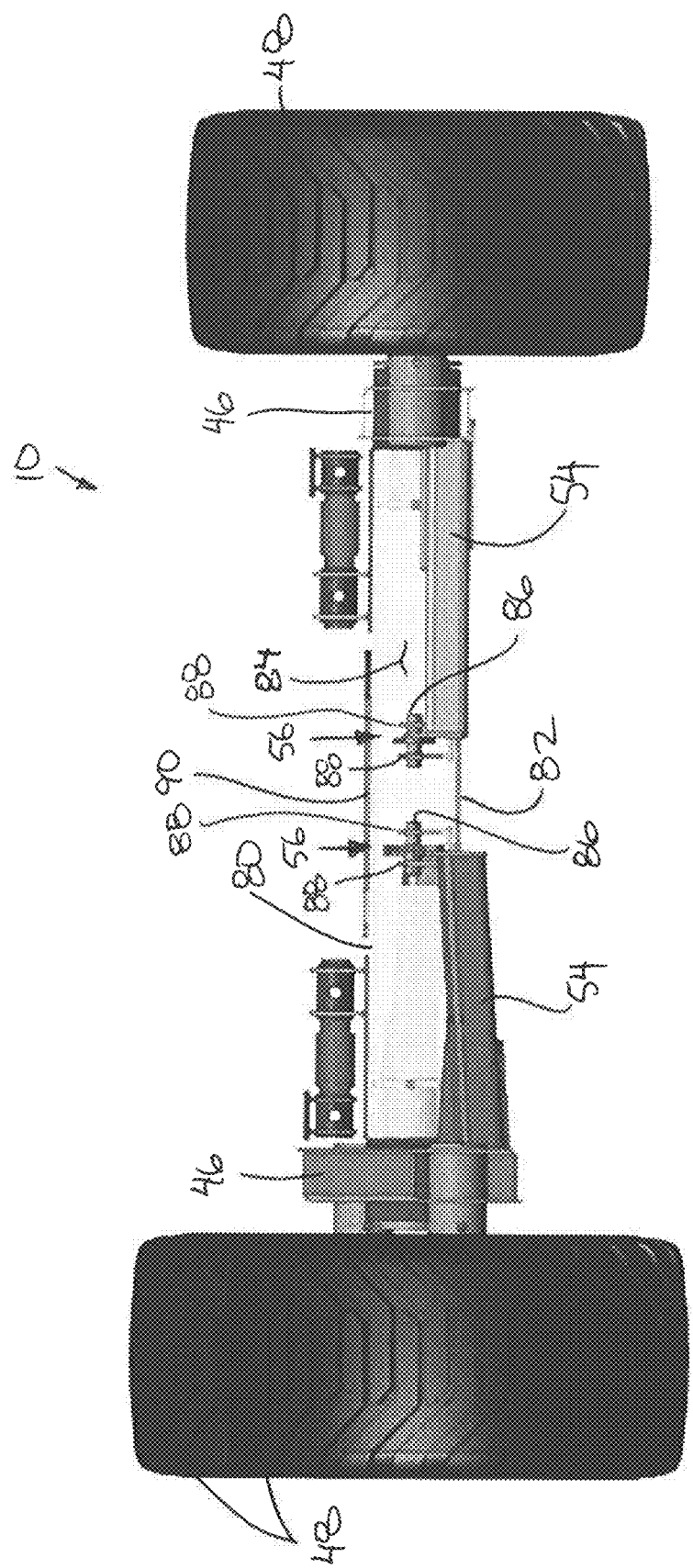
FIG. 9 is a rear elevational view of the walking beam axle assembly according to the second embodiment of FIG. 8.
Figure 10:
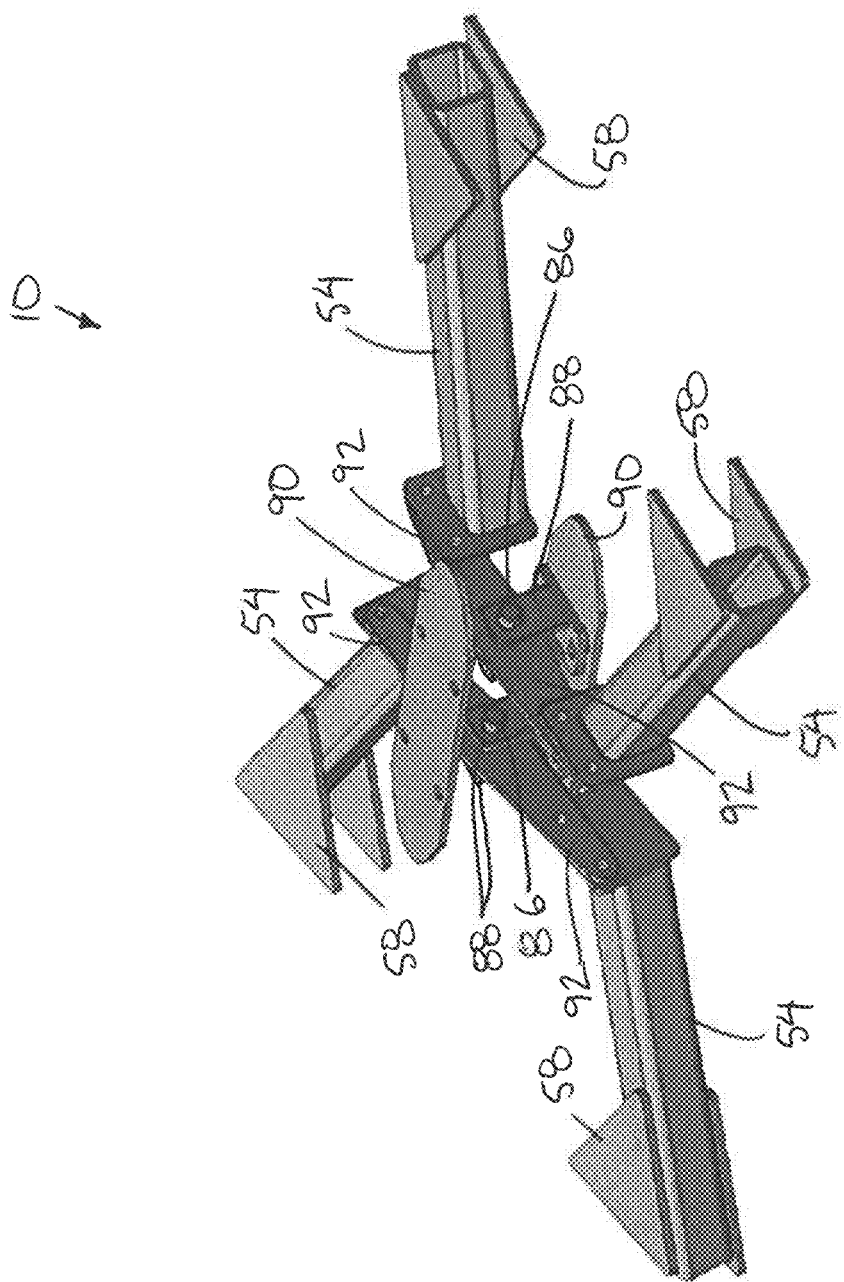
FIG. 10 is a perspective view of a portion of the walking beam axle assembly according to the second embodiment of FIG. 8.

Turning now to the second embodiment of FIGS. 8 through 10, the main axle beam 40 in this instance comprises a beam having a top flange 80 spanning a top side of the beam, a bottom flange 82 spanning a bottom side of the beam, and one or more webs 84 spanning between the top flange and the bottom flange at a central location thereon. The main axle beam 40 may thus comprise an I-beam having a single laterally centered web, or a box beam having a pair of webs at laterally opposing sides of the beam. Similarly to the previous embodiments, a pair of pivot shaft 64 are fixedly attached at both ends of the main axle beam to support the walking beams thereon in a similar arrangement.

In the second embodiment, the web 84 of the main axle beam is interrupted at each hub location and each axle hub 56 is supported on a respective axle shaft 86 concentric with the walking axis at the location where the web 84 is interrupted. Each axle shaft 86 is supported by a pair of parallel mounting plates spaced apart axially of the walking axis so that the axle shaft 86 extends perpendicularly between the mounting plates 88. The mounting plates are fixed to one or both of the top and bottom flanges of the main axle beam. For added structural support, reinforcing plates 90 are secured against of the top side of the top flange of the bottom side of the bottom flange to span axially across all hub locations along the main axle beam.

Each axle hub 56 in this instance comprises a plate member lying perpendicularly to the walking axis which extends radially outward in two opposing directions to define two diametrically opposed arms 92 upon which the inner ends of the two main brace members of the associated walking beam are fixed.

Accordingly, in both embodiments, the brace members are pivotal with the walking beam about the walking axis in which the walking axis is located coaxially with the main axle beam, wholly within the boundary of the profile of the main axle beam by being situated at a central location between the top and bottom sides of the main axle beam and at a central location between the front and rear sides of the main axle beam. Furthermore, the brace members of both walking beams are supported on respective axle hubs fully supported on the main axle beams which also carry the main pivotal connection of the two walking beams respectively. In this manner, fixing the main axle beam to the main frame of the implement only requires the use of the two mounting brackets 42 at opposing ends of the main axle beam as the only connection to the main frame. In this manner, the main frame can be manufactured in a single configuration having two axle mounting surfaces 32 which readily accept the corresponding mounting brackets of a single axle assembly, or the mounting brackets 42 of the walking axle assembly described herein interchangeably with one another at the same mounting location on the main frame of the implement.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A walking beam axle assembly for an agricultural implement having a main frame adapted for movement across ground in a forward working direction, the assembly comprising:
   a main axle beam;
   a plurality of mounting members on the main axle beam adapted to mount the main axle beam in fixed relation to the main frame of the implement to extend in a lateral direction oriented transversely to the forward working direction of the implement;
   two walking beams supported at opposing ends of the main axle beam respectively;
   each walking beam being pivotally coupled to the main axle beam at an intermediate pivot location on the walking beam between opposing ends of the walking beam;
   each walking beam being pivotal relative to the main axle beam about a respective walking beam axis oriented in the lateral direction of the main axle beam;
   two hubs pivotally supported on the main axle beam at respective hub locations spaced inward axially of the main axle beam relative to the opposing ends of the main axle beam respectively;
   each hub being coupled in fixed relation to a respective one of the walking beams by a pair of brace members coupled between the hub and the walking beam at respective brace locations on the walking beam;
   the brace locations of each walking beam being spaced apart at diametrically opposing sides of the intermediate pivot location of the respective walking beam; and
   a pair of wheels rotatable supported on each walking beam at spaced apart wheel locations at diametrically opposing sides of the intermediate pivot location of the respective walking beam;
   each hub being pivotal relative to the main axle beam about the walking beam axis of the respective walking beam together with the respective walking beam.

2. A walking beam axle assembly for an agricultural implement having a main frame adapted for movement across ground in a forward working direction, the assembly comprising:
   a main axle beam adapted to be mounted in fixed relation to the main frame of the implement to extend in a lateral direction oriented transversely to the forward working direction of the implement;
   two walking beams supported at opposing ends of the main axle beam respectively;
   each walking beam being pivotally coupled to the main axle beam at an intermediate pivot location on the walking beam between opposing ends of the walking beam;
   each walking beam being pivotal relative to the main axle beam about a respective walking beam axis oriented in the lateral direction of the main axle beam;
   two hubs pivotally supported on the main axle beam at respective hub locations spaced inward axially of the main axle beam relative to the opposing ends of the main axle beam respectively;
   each hub being coupled in fixed relation to a respective one of the walking beams by a pair of brace members coupled between the hub and the walking beam at respective brace locations on the walking beam;
   the brace locations of each walking beam being spaced apart at diametrically opposing sides of the intermediate pivot location of the respective walking beam;
   a pair of wheels rotatable supported on each walking beam at spaced apart wheel locations at diametrically opposing sides of the intermediate pivot location of the respective walking beam;
   each hub being pivotal relative to the main axle beam about the walking beam axis of the respective walking beam; and a pair of mounting plates at laterally opposing ends of the main axle beam having fastener apertures therein so as to be adapted to be fastened to the main frame of the implement using threaded fasteners extending through the mounting plates as the only connection of the assembly to the main frame of the implement.

3. The assembly according to claim 1 wherein the brace locations on each walking beam are located between the pair of wheels of the respective walking beam in a longitudinal direction of the walking beam.

4. The assembly according to claim 1 wherein each of the brace members are coupled to the respective walking beam at a location which is between the respective wheels of the walking beam.

5. The assembly according to claim 1 wherein a cross sectional shape of the main axle beam defines a perimeter boundary and wherein the walking beam axes of both walking beams are contained within the perimeter boundary of the main axle beam.

6. The assembly according to claim 1 wherein each hub fully encircles the main axle beam.

7. A walking beam axle assembly for an agricultural implement having a main frame adapted for movement across ground in a forward working direction, the assembly comprising:
    a main axle beam adapted to be mounted in fixed relation to the main frame of the implement to extend in a lateral direction oriented transversely to the forward working direction of the implement;
    two walking beams supported at opposing ends of the main axle beam respectively;
    each walking beam being pivotally coupled to the main axle beam at an intermediate pivot location on the walking beam between opposing ends of the walking beam;
    each walking beam being pivotal relative to the main axle beam about a respective walking beam axis oriented in the lateral direction of the main axle beam;
    two hubs pivotally supported on the main axle beam at respective hub locations spaced inward axially of the main axle beam relative to the opposing ends of the main axle beam respectively;
    each hub being coupled in fixed relation to a respective one of the walking beams by a pair of brace members coupled between the hub and the walking beam at respective brace locations on the walking beam;
    the brace locations of each walking beam being spaced apart at diametrically opposing sides of the intermediate pivot location of the respective walking beam;
    a pair of wheels rotatable supported on each walking beam at spaced apart wheel locations at diametrically opposing sides of the intermediate pivot location of the respective walking beam;
    each hub being pivotal relative to the main axle beam about the walking beam axis of the respective walking beam; and
    a bushing formed of a material having a low coefficient of friction encircling the main axle beam between each hub and the main axle beam.

8. The assembly according to claim 1 wherein the main axle beam comprises a tubular member locating the walking beam axes concentrically within the tubular member.

9. A walking beam axle assembly for an agricultural implement having a main frame adapted for movement across ground in a forward working direction, the assembly comprising:
    a main axle beam adapted to be mounted in fixed relation to the main frame of the implement to extend in a lateral direction oriented transversely to the forward working direction of the implement;
    two walking beams supported at opposing ends of the main axle beam respectively;
    each walking beam being pivotally coupled to the main axle beam at an intermediate pivot location on the walking beam between opposing ends of the walking beam;
    each walking beam being pivotal relative to the main axle beam about a respective walking beam axis oriented in the lateral direction of the main axle beam;
    two hubs pivotally supported on the main axle beam at respective hub locations spaced inward axially of the main axle beam relative to the opposing ends of the main axle beam respectively;
    each hub being coupled in fixed relation to a respective one of the walking beams by a pair of brace members coupled between the hub and the walking beam at respective brace locations on the walking beam;
    the brace locations of each walking beam being spaced apart at diametrically opposing sides of the intermediate pivot location of the respective walking beam; and
    a pair of wheels rotatable supported on each walking beam at spaced apart wheel locations at diametrically opposing sides of the intermediate pivot location of the respective walking beam;
    each hub being pivotal relative to the main axle beam about the walking beam axis of the respective walking beam;
    wherein the main axle beam comprises a tubular member having a cylindrical outer surface rotatably supporting the hubs thereon; and
    wherein each hub comprises a plurality of arcuate sections coupled to one another using fasteners so as to fully encircle the cylindrical outer surface of the main axle beam.

10. The assembly according to claim 1 wherein the main axle beam comprises a top flange spanning a top side of the beam, a bottom flange spanning a bottom side of the beam, and at least one web connected between the top flange and the bottom flange, said at least one web being interrupted at each of the hub locations, and each hub location including a pivot shaft fixed onto the main axle beam upon which the respective hub is pivotally supported.

11. An agricultural implement comprising:
    a main frame adapted for movement across ground in a forward working direction; and
    a walking axle assembly comprising:
        a main axle beam mounted in fixed relation to the main frame of the implement to extend in a lateral direction oriented transversely to the forward working direction of the implement;
        two walking beams supported at opposing ends of the main axle beam respectively;
        each walking beam being pivotally coupled to the main axle beam at an intermediate pivot location on the walking beam between opposing ends of the walking beam;
        each walking beam being pivotal relative to the main axle beam about a respective walking beam axis oriented in the lateral direction of the main axle beam;
        two hubs pivotally supported on the main axle beam at respective hub locations spaced inward axially of the main axle beam relative to the opposing ends of the main axle beam respectively;

each hub being coupled in fixed relation to a respective one of the walking beams by a pair of brace members coupled between the hub and the walking beam at respective brace locations on the walking beam;

the brace locations of each walking beam being spaced apart at diametrically opposing sides of the intermediate pivot location of the respective walking beam; and a pair of wheels rotatable supported on each walking beam at spaced apart wheel locations at diametrically opposing sides of the intermediate pivot location of the respective walking beam;

each hub being pivotal relative to the main axle beam about the walking beam axis of the respective walking beam together with the respective walking beam.

12. The implement according to claim 11 further comprising a pair of mounting plates at laterally opposing ends of the main axle beam having fastener apertures therein so as to be adapted to be fastened to the main frame of the implement using threaded fasteners extending through the mounting plates as the only connection of the assembly to the main frame of the implement.

13. The implement according to claim 11 wherein the brace locations on each walking beam are located between the pair of wheels of the respective walking beam in a longitudinal direction of the walking beam.

14. The implement according to claim 11 wherein each of the brace members are coupled to the respective walking beam at a location which is between the respective wheels of the walking beam.

15. The implement according to claim 11 wherein a cross sectional shape of the main axle beam defines a perimeter boundary and wherein the walking beam axes of both walking beams are contained within the perimeter boundary of the main axle beam.

16. The implement according to claim 11 wherein each hub fully encircles the main axle beam.

17. The implement according to claim 11 further comprising a bushing formed of a material having a low coefficient of friction encircling the main axle beam between each hub and the main axle beam.

18. The implement according to claim 11 wherein the main axle beam comprises a tubular member locating the walking beam axes concentrically within the tubular member.

19. The implement according to claim 11 wherein the main axle beam comprises a tubular member having a cylindrical outer surface rotatably supporting the hubs thereon and wherein each hub comprises a plurality of arcuate sections coupled to one another using fasteners so as to fully encircle the cylindrical outer surface of the main axle beam.

20. The implement according to claim 11 wherein the main axle beam comprises a top flange spanning a top side of the beam, a bottom flange spanning a bottom side of the beam, and at least one web connected between the top flange and the bottom flange, said at least one web being interrupted at each of the hub locations, and each hub location including a pivot shaft fixed onto the main axle beam upon which the respective hub is pivotally supported.

* * * * *